S. DARLING.
Compensating Errors in Screws of Dividing Engines.

No. 226,162. Patented April 6, 1880.

Witnesses.
Benj. Grigley
Geo. H. Smith

Inventor.
Samuel Darling

UNITED STATES PATENT OFFICE.

SAMUEL DARLING, OF PROVIDENCE, RHODE ISLAND.

COMPENSATING ERRORS IN SCREWS OF DIVIDING-ENGINES.

SPECIFICATION forming part of Letters Patent No. 226,162, dated April 6, 1880.

Application filed November 11, 1879.

*To all whom it may concern:*

Be it known that I, SAMUEL DARLING, of the city of Providence and State of Rhode Island, have invented a new and useful Method of Compensating Local and General Errors or Changes in the Pitch of Screws; and I do hereby declare that the following, taken in connection with the drawings which accompany and form part of this specification, is a description sufficient to enable those skilled in the art to practice it.

The object of my invention is to provide means for making a screw of a more uniform pitch than the leading-screw of the engine by which it is manufactured, or for making a screw in a part or the whole of its length of a different pitch from the screw of the engine by which it is manufactured, and also for graduating a scale into divisions more uniform than the pitch of the screw of the graduating-machine by which it is graduated, or to graduate scales into divisions varying in length with the same apparatus; and it consists in so constructing and arranging the leading screws and nuts used in screw-cutting engines and graduating-machines, or any machine for a similar purpose, that the longitudinal motion of the nut produced by the revolutions of the screw can be regularly accelerated or retarded in one or more portions of the screw and not in other portions, and also can be accelerated in some parts of the screw and retarded in others, whereby local errors of pitch and errors of pitch in the whole or part of the screw can be compensated and the motion of the nut relative to the number of revolutions of the screw be regularly or irregularly increased or diminished the whole length of the screw or in any part of it.

Figure 1:
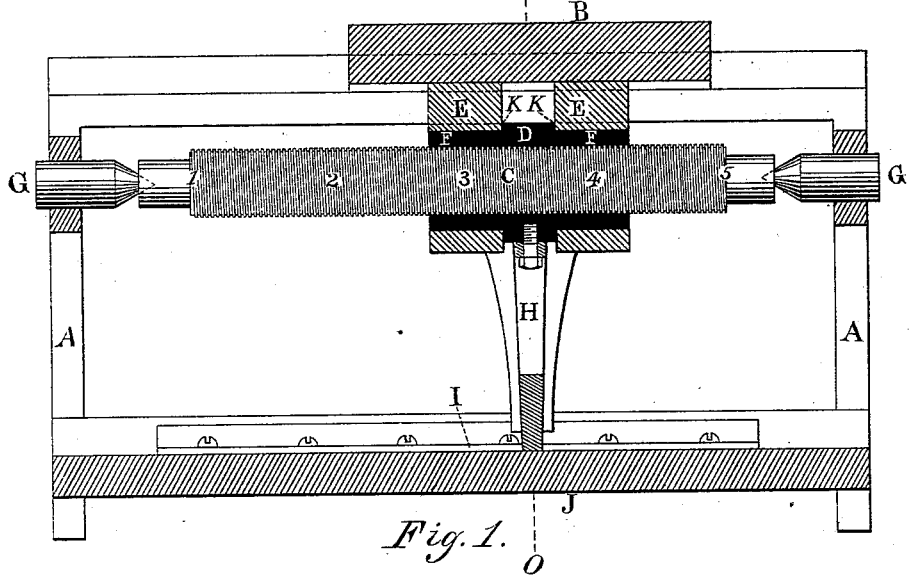
Figure 2:
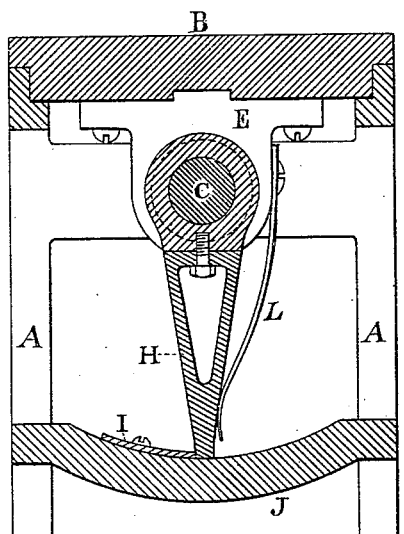
Figure 3:
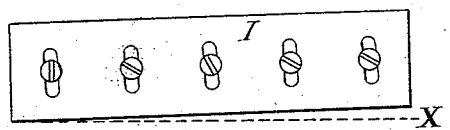
Figure 4:
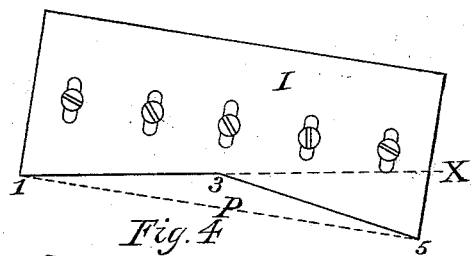
Figure 5:
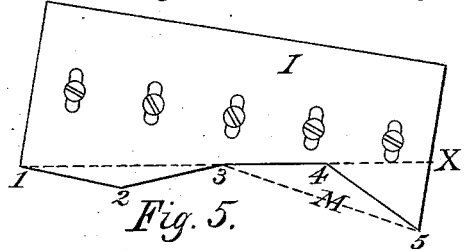

Figure 1 in the drawings represents a side elevation of the screw and centers and a vertical longitudinal section of the frame-work and other parts of a graduating-machine embracing my improvement; Fig. 2, a vertical transverse section of Fig. 1 through line O O; Figs. 3, 4, and 5, top views of guide I in different forms.

A represents the frame-work; B, sliding bed to hold article being graduated; C, the screw; D, the screw-nut; E E, boxes for the bearings of the nut; F F, bearings of the nut; G G, centers upon which the screw is mounted; H, arm attached to the nut; I, guide for arm H; J, concave bed to which guide I is attached; K K, shoulders on the nut; L, spring attached to boxes E E and bearing against the lower end of arm H.

Boxes E E are bolted firmly to the platen B, and the bearings of the nut F F are closely fitted to the boxes. The inner ends of the boxes bear firmly against the shoulders K K of the nut. The screw C is mounted upon the centers G G, which are accurately fitted and adjusted to prevent any longitudinal movement of the screw. The arm H is firmly attached to nut D. Guide I is held in position by the concave bed J, to which it is bolted. Spring L is bolted to boxes E E, and holds the lower end of arm H against the guide I.

To explain the operation of my new method of compensating errors and changes in the pitch of screws, I will suppose the screw represented by C to be of uniform pitch throughout its length, and to have been made for standard length and ten threads to the inch, but proved to be one ten-thousandth of an inch short of the correct standard in one hundred threads. Therefore one revolution of the nut or screw and one ninety-nine-thousand-nine-hundred-ninety-ninths ($\frac{1}{99999}$) of a revolution would be required to move the nut longitudinally on the screw one-tenth of a standard inch, and of course one hundred revolutions and one hundred ninety-nine-thousand-nine-hundred-ninety-ninths ($\frac{100}{99999}$) of a revolution would be required to move the nut ten standard inches. Therefore, by so placing guide I, Fig. 3, that it will diverge from a line, X, parallel with the screw sufficiently in one hundred threads of the screw and one hundred ninety-nine - thousand - nine-hundred - ninety-ninths ($\frac{100}{99999}$) of a thread to swing arm H in an opposite direction, in which the screw revolves one hundred ninety-nine-thousand-nine-hundred-ninety-ninths ($\frac{100}{99999}$) of the circle of which arm H is the radius, the nut will be moved longitudinally on the screw one-tenth of a standard inch by each revolution of the screw, and ten standard inches by every hundred revolutions of the screw; and thus the error of one ten-thousandth of an inch in one hundred threads will be compensated. One hundred ninety-nine-thousand-nine-hundred-ninety-ninths of the circle of which arm H is the radius equals five-fourteenths of a degree within an inappreciable amount, or fifty-three ten-thousandths of an inch.

Arm H being eight inches long, one degree of the circle of which it is the radius is within a very small fraction of one hundred thirty-nine and one-half thousandths of an inch; and any one skilled in the art can readily place guide I at the angle required.

After placing guide I as near as convenient by a graduated rule, a scale should be graduated by the screw and compared to the standard, and if not correct the guide can be set at a greater or lesser angle, according to what the scale varies, and two or three trials will generally produce the accuracy required.

Having explained how to compensate an error or change in the general length of a screw when the pitch is uniform, I will now explain how local errors, as well as errors or changes in the whole length, can be compensated; and for that purpose screw C is supposed to be worn out of true, and found to be one-thousandth of an inch longer than the standard in every one hundred threads, and that the fifty threads from 1 to 3 are one-thousandth of an inch shorter than the fifty threads from 3 to 5, and also that the twenty-five threads from 1 to 2 are one fifteen-hundredth of an inch longer than the twenty-five from 2 to 3, and the twenty-five threads from 3 to 4 one-thousandth of an inch shorter than the twenty-five from 4 to 5.

The screw being one-thousandth of an inch too long in one hundred threads, to compensate that error, guide I, Fig. 4, must be set at an angle with the screw ten times greater (see dotted line P) than it was to correct the screw C when it varied only one ten-thousandth of an inch, in which case the end of guide I at 5 will be very near one-hundredth of a revolution, or three and six-tenths degrees, or four hundred ninety-six and one-half thousandths of an inch from line X, measuring with a flexible rule to conform to the hollow shape of the guide-holder J.

The fifty threads from 1 to 3 being one-thousandth of an inch shorter than the fifty threads from 3 to 5, to make them equal guide I must be shaped as shown in Fig. 4, line 1 3 5, the line at 3 being within a very small fraction of one two-hundredth of a revolution of the nut, or one and eight-tenths degree, or two hundred and forty-eight and a quarter thousandths of an inch from line P, guide I having been swung to that line, P, to shorten the whole length one-thousandth of an inch, which is within a very small fraction of one-hundredth of a revolution of the nut, and thus the run of the nut from 1 to 5 will be shortened one-thousandth of an inch, and the whole length made correct; and guide I being cut from dotted line P to 3, which is practically one two-hundredth of a revolution of the nut, or one and eight-tenths degree, the run of the nut from 1 to 3 will be increased one two-thousandth of an inch, and from 3 to 5 it will be diminished one two-thousandth of an inch, thus making the two parts of the screw of equal length.

Having shown how the whole length and the two halves can be made of the correct standard, I will now illustrate how the errors in the whole length, halves, and quarters can be compensated, which will sufficiently explain the principle of my invention to enable others to use it and carry the correction to any degree of accuracy desired.

The dotted line M in Fig. 5 shows the form of guide I in Fig. 4 which was required to make the whole length and the two halves of standard length. Line 1 2 3 4 5, Fig. 5, shows the shape of guide I required to make the whole length, halves, and quarters of the correct standard. The twenty-five threads from 1 to 2 are one fifteen-hundredth of an inch longer than the twenty-five from 2 to 3; consequently the guide at 2 must be one three-hundredth of a revolution of the nut from line M, which shortens the run of the nut from 1 to 2 one three-thousandth of an inch, and lengthens it one three-thousandth of an inch from 2 to 3. The twenty-five threads of the screw from 3 to 4 are one-thousandth of an inch shorter than the twenty-five from 4 to 5, and the guide at 4 must be one two-hundredth of a revolution of the nut from dotted line M to increase the run of the nut from 3 to 4 one two-thousandth of an inch, and to shorten it from 4 to 5 the same amount.

When a square-thread screw is used, and both sides do not agree, two guides and two springs may be used, one for each side of the thread, the springs operating alternately; or any other known device can be employed to bear the arm H against the guides.

Having fully explained my invention, I claim—

1. The hereinbefore-described method of compensating errors and changes in the pitch of screws, by turning the nut during its passage over the screw, substantially as herein described and set forth.

2. The combination, in a graduating or screw-cutting machine, of a screw, C, nut D, arm H, and guide J, substantially as herein described and set forth.

SAMUEL DARLING.

Witnesses:
JOHN E. HALL,
J. L. INGRAHAM.